US006382546B1

(12) United States Patent
Hebert

(10) Patent No.: US 6,382,546 B1
(45) Date of Patent: May 7, 2002

(54) MEDIA CASSETTE FOR IMAGING SYSTEM

(75) Inventor: Thomas K. Hebert, Groveland, MA (US)

(73) Assignee: Agfa Corporation, Wilmington, MA (US)

( * ) Notice: Subject to any disclaimer, the term of this patent is extended or adjusted under 35 U.S.C. 154(b) by 0 days.

(21) Appl. No.: 09/408,783

(22) Filed: Sep. 30, 1999

(51) Int. Cl.[7] ............................ G03B 1/58; G11B 15/66

(52) U.S. Cl. ................................ 242/332.7; 242/348.1; 242/586.1; 242/586.6

(58) Field of Search ........................... 242/348.1, 332.7, 242/332.8, 532.5, 532.6, 586.5, 586.6, 586.1

(56) References Cited

U.S. PATENT DOCUMENTS 4,396,164 A * 8/1983 Maeda et al. ............ 242/332.7

* cited by examiner

*Primary Examiner*—John Q. Nguyen

(74) *Attorney, Agent, or Firm*—William E. Hilton; Joseph D. King

(57) ABSTRACT

A media receiving cassette is disclosed for use in a system in which a web of media is transferred from a supply cassette to the receiving cassette. The media receiving cassette includes a housing, a rotatable core, and a spring biased grasping mechanism. The housing includes first and second opposing ends, and at least one of the ends includes a generally circular track therein that includes an extended portion which extends radially outwardly. The rotatable core is coupled to the first and second opposing ends of the housing such that an axis of rotation of the core extends through each of the first and second ends. The spring biased grasping mechanism is attached to the rotatable core via at least one spring. The grasping mechanism includes a tracking member that engages the generally circular track such that the grasping mechanism is permitted to move radially outwardly away from the core when the tracking member is positioned in the extended portion of the generally circular track to thereby permit the media to be received in the core. The grasping mechanism is permitted to move radially inwardly toward the core when the tracking member is positioned in a location other than in the extended portion of the generally circular track.

26 Claims, 5 Drawing Sheets

MEDIA CASSETTE FOR IMAGING SYSTEM

BACKGROUND OF THE INVENTION

The invention relates to the field of imaging systems, and particularly relates to imaging systems in which a continuous web of media is fed through an imaging apparatus. Imaging systems that feed recording media through an imaging apparatus may include a movable optical carriage that displaces a beam of light from an imaging source, such as a laser. The carriage moves in a direction transverse to the direction of movement of the web in a slow scan to expose a supply of recording media to the light beam. Such a carriage for use in an imaging system including an internal imaging drum for supporting the recording media, is disclosed for example in U.S. Pat. No. 5,598,739, the disclosure of which is hereby incorporated by reference.

As shown in FIG. 1, in a conventional imaging system 10 including an imaging drum 12, a web of image recording media 14 travels from a supply cassette 16 around the inner support surface 18 of the drum 12 to a take up cassette 20. The media generally has sufficient inherent stiffness that it maintains the cylindrical shape of the inner surface 18 of the drum 12 when coupled to cassettes 16 and 20. A movable carriage 22 may be used to position a beam of laser light 24 on desired portions of the recording surface 26 of the media 14. The imaging system 10 is typically coupled to a computer controlled image processor (not shown). The media is typically driven through the system by drive rollers 28 and 30.

Each cassette is typically sealed from light as appropriate, and each provides an elongated opening through which the web of media may pass as it exits the supply cassette 16 and enters the take up cassette 20. The cassettes may be loaded into the system via access openings and/or by removing a top cover. During use, the media is advanced from the supply cassette 16, around the drum surface 18, and up to the take up cassette 20. The take up cassette 20 receives the media and typically includes an active take up roll around which the media is typically wrapped.

The take up (or media receiving) cassette may include a mechanism for grasping the leading edge of the media as it enters the receiving cassette 20. A conventional technique for grasping the leading edge of the media involves providing a core that includes a portion that opens when the core is rotated in the reverse direction, and closes on the media when the core is rotated in the forward direction. It is necessary to ensure proper alignment of the core opening and the approaching leading edge of the media. Such mechanisms, however, are relatively mechanically complex, which results in increased manufacturing cost and increased potential risk of mechanical failure.

There is a need, therefore, for a media receiving cassette that is effective to grasp media, and efficient and economical to manufacture.

SUMMARY OF THE INVENTION

The invention provides a media receiving cassette for use in a system in which a web of media is transferred from a supply cassette, through an imaging region, to the receiving cassette. The media receiving cassette includes a housing, a rotatable core, and a spring biased grasping mechanism. The housing includes first and second opposing ends, and at least one of the ends includes a generally circular track therein that includes an extended portion which extends radially outwardly. The rotatable core is coupled to the first and second opposing ends of the housing such that an axis of rotation of the core extends through each of the first and second ends. The spring biased grasping mechanism is attached to the rotatable core via at least one spring. The grasping mechanism includes a tracking member that engages the generally circular track such that the grasping mechanism is permitted to move radially outwardly away from the core when the tracking member is positioned in the extended portion of the generally circular track to thereby permit the media to be received in the core. The grasping mechanism is permitted to move radially inwardly toward the core when the tracking member is positioned in a location other than in the extended portion of the generally circular track.

BRIEF DESCRIPTION OF THE DRAWINGS

The following description may be further understood with reference to the accompanying drawings in which.

The drawings are shown for illustrative purposes only, and are not to scale.

DETAILED DESCRIPTION OF THE INVENTION

Figure 1:
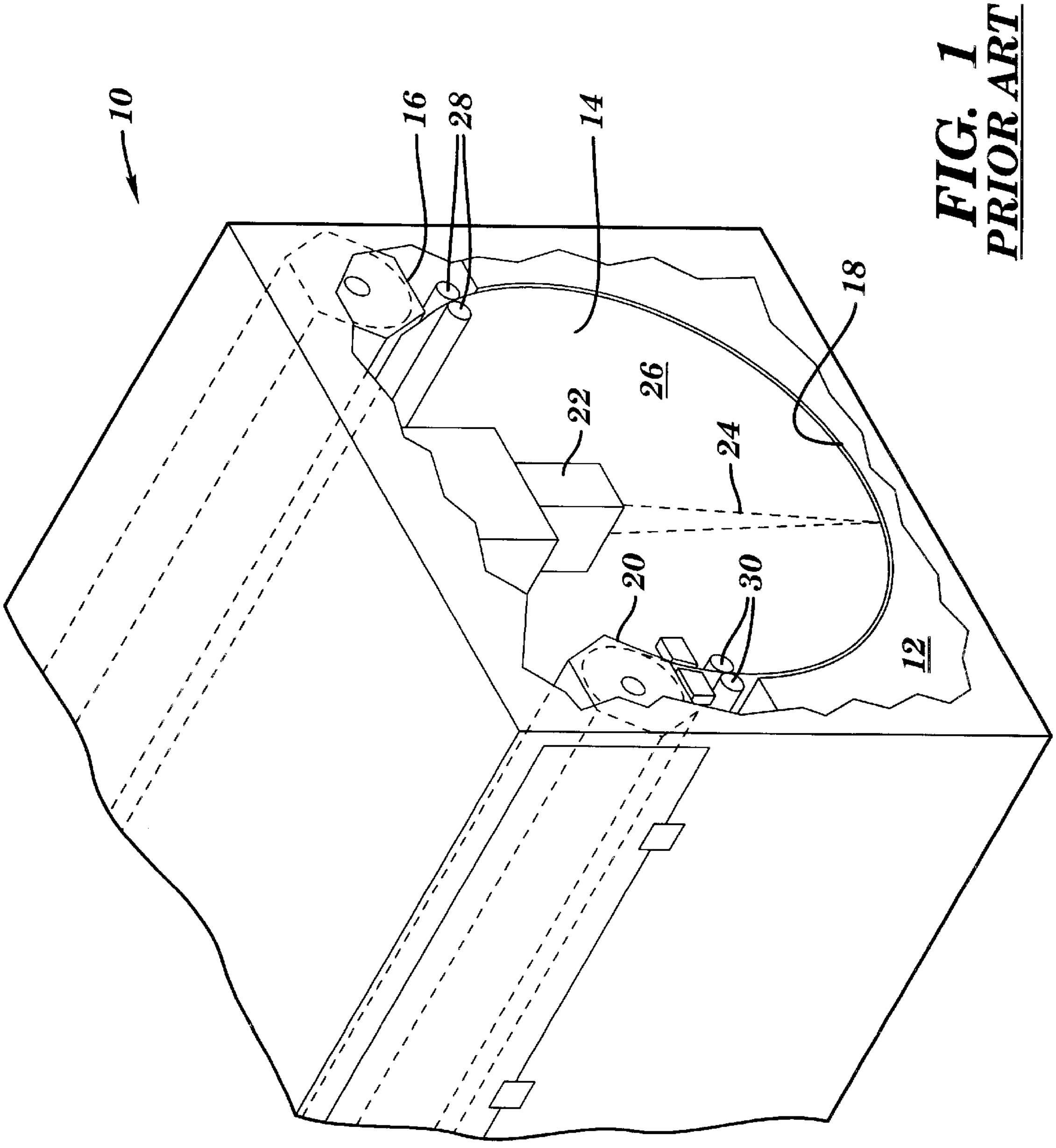
FIG. 1 PRIOR ART
FIG. 1 shows an illustrative view of a portion of a conventional imaging system.
Figure 2:
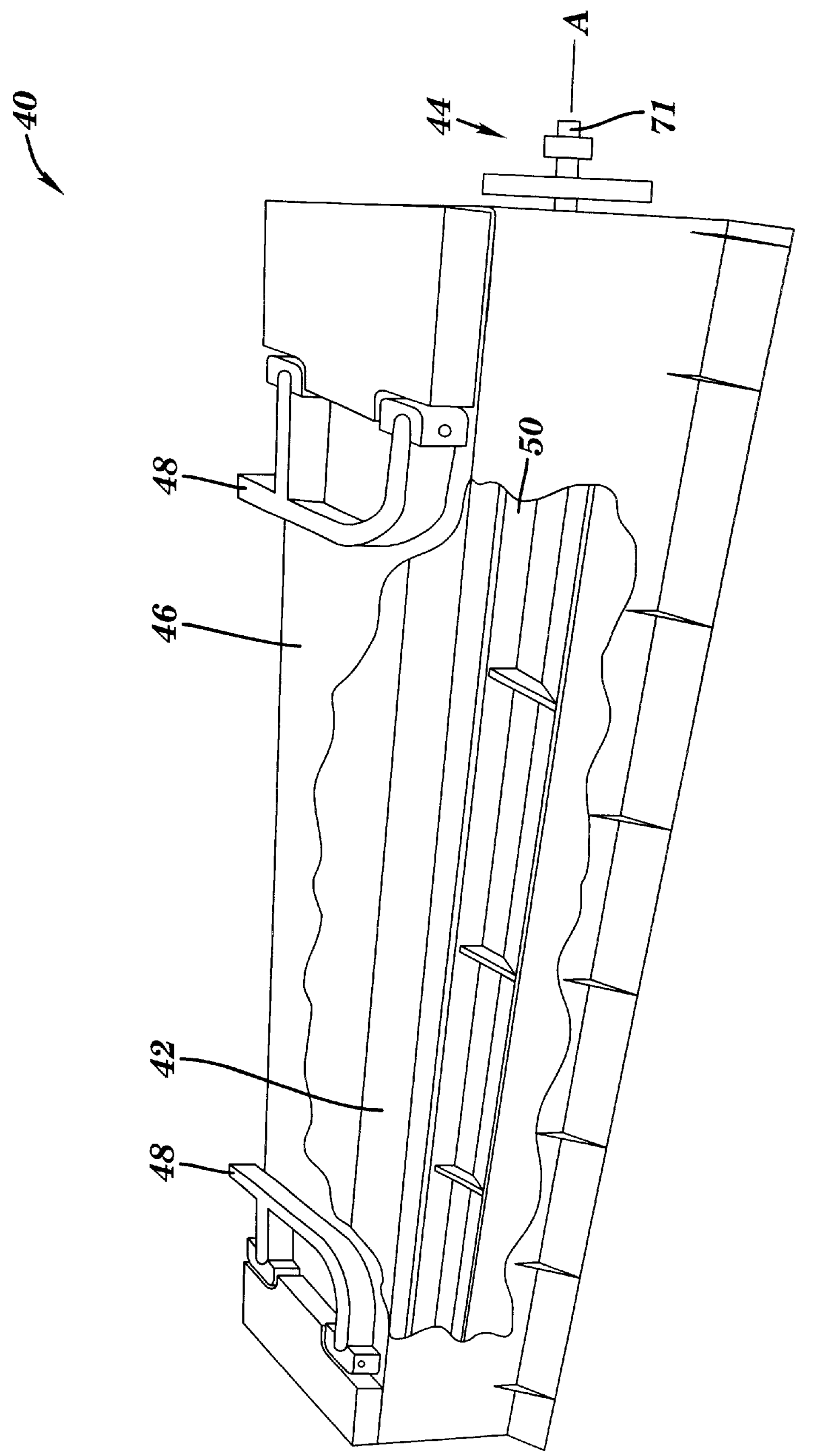
FIG. 2 shows an illustrative perspective view of a media receiving cassette of an embodiment of the invention with a portion of the top cover removed.

As shown in FIG. 2, a media receiving cassette 40 of an embodiment of the invention includes a core 42 that may be rotated via axial shaft 71 with respect to an axis generally indicated at A via actuation of drive mechanism 44. The cassette 40 also includes a top cover 46, and flip up handles 48 for facilitating handling.

Figure 4:
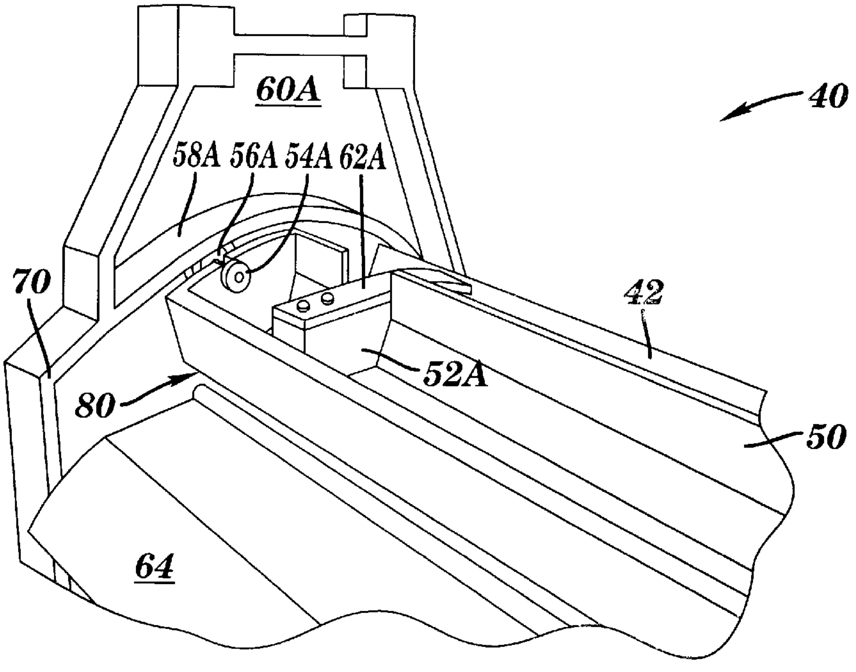
FIG. 4 shows an illustrative perspective view of the receiving cassette shown in FIG. 3 in the media grasp position.
Figure 5:
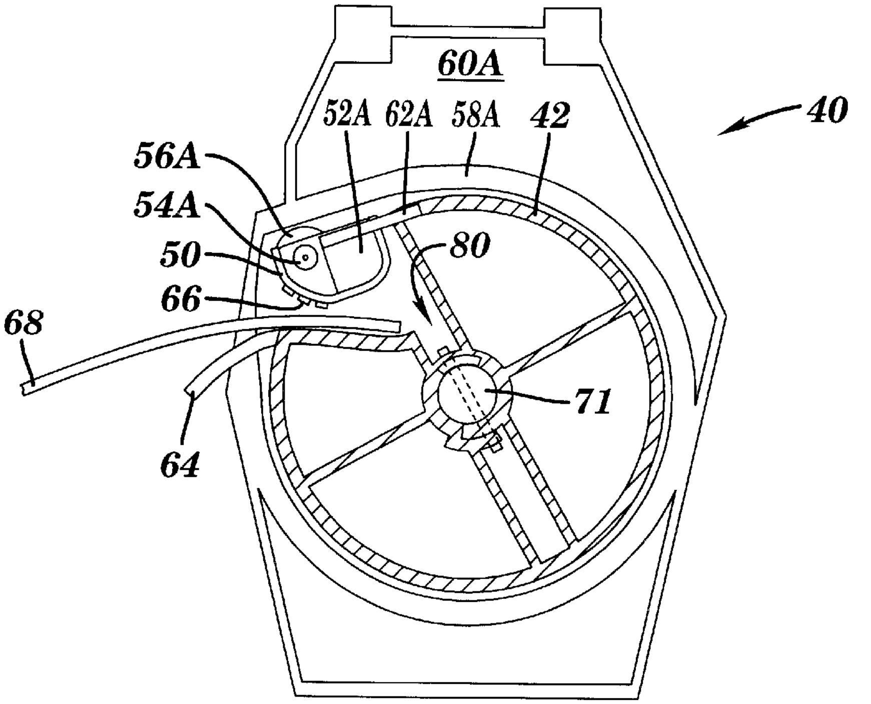
FIG. 5 shows an illustrative end view of the receiving cassette shown in FIG. 3 taken along the line 5—5 thereof.
Figure 7:
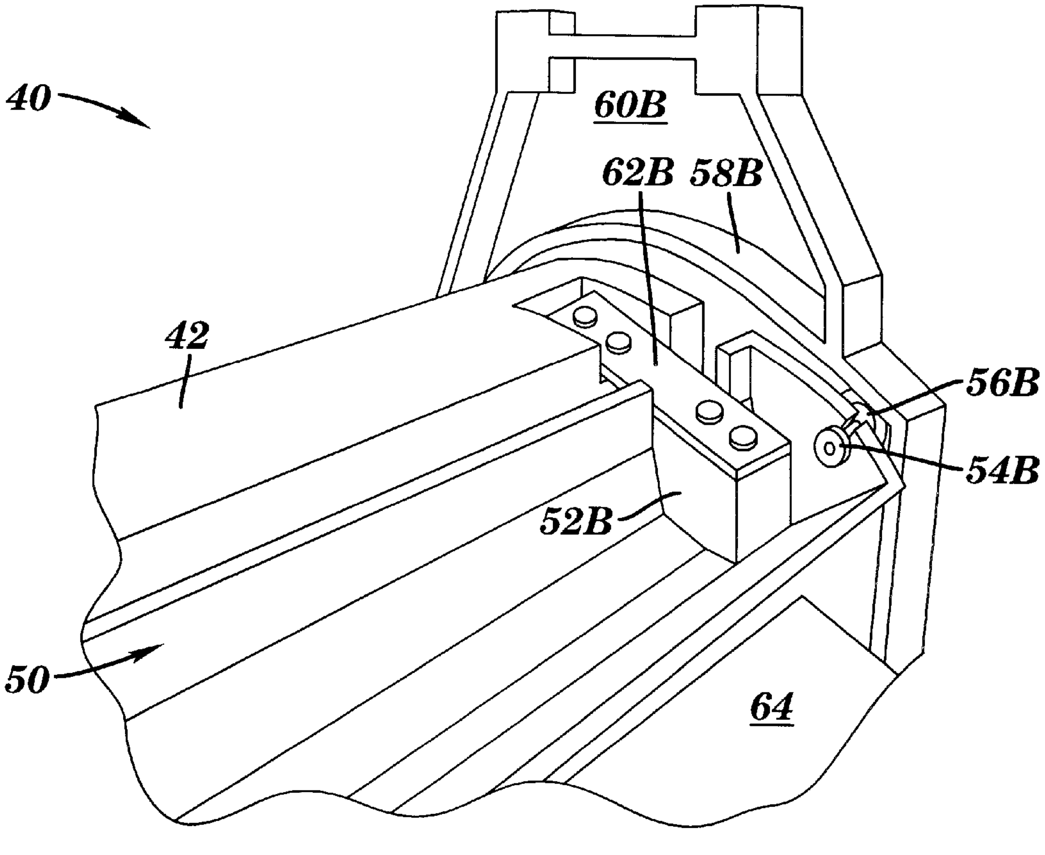
FIG. 7 shows the opposite end of the receiving cassette shown in FIGS. 3–6 as having the identical structure.

Attached to the core 42 is a spring biased media grasping unit 50. Referring to FIG. 5, grasping unit 50 is attached to core 42 in a cantilever manner using at least one, and preferably two, generally flat leaf springs 62A and 62B(FIG. 7). As further shown in FIGS. 3 and 4, the grasping unit 50 includes a spring attachment portion 52A, and a wheel tracking assembly 54A. The tracking assembly 54A includes an outer wheel 56A that travels along the inside surface of a generally circular wall 58A in an end portion 60A of the cassette housing. As used herein, the term "generally circular" is intended to mean that it's shape generally defines a circuit, or loop path. The cassette also includes a spring 62A formed of sheet metal that is attached to the core 42 and the grasping unit 50. The spring 62A is biased in a straight position. The cassette may also include an optional media support plate 64 that rotates with the core 42, and is fixed to the core 42 below the grasping unit 50.

Figure 3:
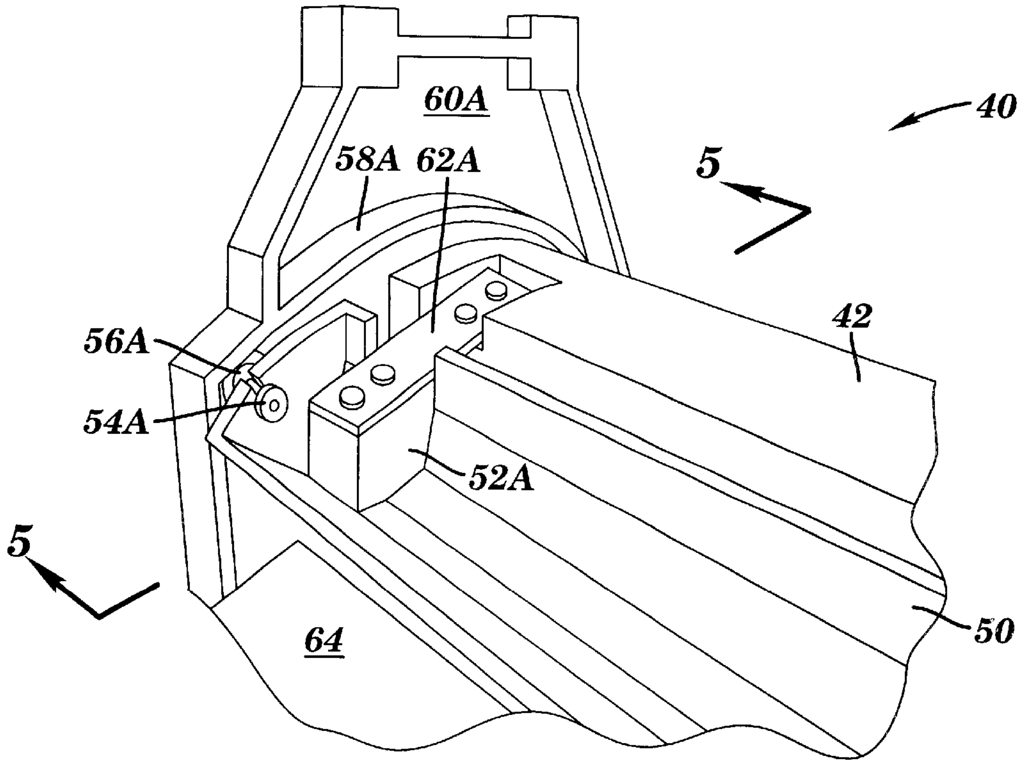
FIG. 3 shows an illustrative perspective view of one end of the receiving cassette shown in FIG. 2 with the top cover removed and in the open position.
Figure 6:
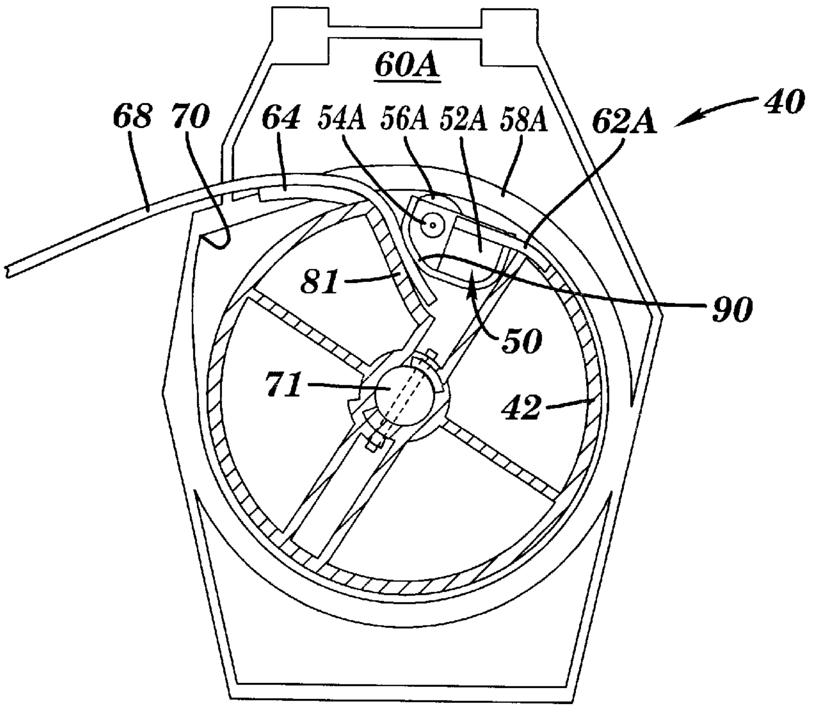
FIG. 6 shows an illustrative end view of the receiving cassette shown in FIG. 5 in the media grasp position.

As further shown in FIGS. 5 and 6, the generally circular wall 58A includes an extended portion 70 that extends outside of the circle defined by the remaining portion of the wall 58A. The core 42 may be formed of two parts that join at the axis of rotation. During use, the outer wheel 56A of the assembly 54A follows along the inside surface of the wall 58A as the core 42 rotates. When the outer wheel 56A reaches the area of the extended portion 70, the spring 62A urges the grasping unit to move away from the core 42, providing an opening through which the media 68 may enter the core 42. When the core 42 continues to rotate, the outer wheel 56A is constrained by the wall 58A, and urges the grasping unit 50 radially inward against the action of the spring 62A. When the grasping unit 50 is urged radially inward, grippers 66 on the outer surface of the unit 50 engage the media 68, and hold the leading edge of the media as the core rotates. Although the grasping unit 50 opens each time the outer wheel 56A passes through the extended portion 70 as the core rotates, sufficient holding tension is generated by the media wrapped around the core. In particular, it has been discovered that even with one revolution only, that the core maintains a sufficiently firm grip on the media to permit the media to be wrapped about the core within the receiving cassette. In a preferred embodiment, a tracking assembly 54A,54B and a spring 62A,62B are provided on each end of the grasping unit 50, which extends along the length of the core 42 as shown in FIGS. 3 and 7.

Receiving cassettes of the invention provide reduced manufacturing costs and reduced design complexities. Moreover, the grasping unit may be designed to reverse the natural curl of the leading edge of the media 68. In alternative embodiments, the tracking assembly may include a retained bearing that engages the inside surface of the wall 58A, and follows along the wall as does the outer wheel 56A. When the media 68 is removed from the receiving cassette (for film processing), the grasping unit 50 will open as the tracking assembly approaches the extended portion 70 in the wall 58A, and the leading (now trailing) edge of the media will be released.

Those skilled in the art will appreciate that numerous modifications and variations may be made to the above disclosed embodiments without departing from the spirit and scope of the present invention.

What is claimed is:

1. A media receiving cassette for use in a system in which a web of media is transferred from a supply cassette to said receiving cassette, said media receiving cassette comprising:

a housing having first and second opposing ends, each of said ends including a generally circular track, said track having an extended portion that extends radially outward;

a rotatable core coupled to said first and second opposing ends of said housing such that an axis of rotation of said core extends through each of said first and second ends;

a groove longitudinally formed into a surface of said core for receiving a spring biased grasping unit;

wherein said grasping unit is cantilevered to said rotatable core via at least one generally flat leaf spring, said at least one generally flat leaf spring operative to bias said grasping unit radially outward from said rotatable core; and a wheel rotatably attached to each end of said grasping unit, each wheel moveably engaging one of said generally circular tracks such that said grasping unit moves radially outward away from said groove when said wheels are positioned in said extended portion of said generally circular tracks permitting the media to be received in between said core and said grasping unit, said grasping unit moves radially inward toward said groove when said wheels are positioned in a location on said tracks other than in said extended portion of said generally circular tracks.

2. The media receiving cassette as claimed in claim 1, wherein said wheels freely rotate so said wheels follow along said generally circular track in response to a rotation of said rotatable core.

3. The media receiving cassette as claimed in claim 1, wherein said grasping unit includes at least one gripping element deposed on an outer surface of said grasping unit for engaging the media.

4. The media receiving cassette as claimed in claim 1, wherein said rotatable core is formed from two separate pieces joined together around an axial shaft.

5. The media receiving cassette as claimed in claim 1, wherein said tracking member is spring biased in a radially outward direction.

6. The media receiving cassette as claimed in claim 1, wherein said grasping mechanism extends along a longitudinal length of said core.

7. The media receiving cassette as claimed in claim 1, wherein said spring biased grasping unit is cantilevered to said rotatable core via a pair of generally flat leaf springs.

8. The grasping unit of claim 1 further comprising:

a first surface having a shape conforming to a portion of a second surface of said groove, said first surface extending along a longitudinal length of said core; and at least one gripper attached to said first surface along a longitudinal length of said grasping unit.

9. A media receiving cassette for use in an imaging system in which a web of imageable media is transferred from a supply cassette, through an imaging region, to said receiving cassette, said media receiving cassette comprising:

a rotatable core;

a groove longitudinally formed into a surface of said core for receiving a grasping means;

said grasping means cantilevered to said core via at least one flat leaf spring, said grasping means for grasping the media between a surface of said groove and said grasping means; and tracking means coupled to said grasping means for providing that said grasping means opens to receive media between said core and said grasping means when said core is rotated to a first rotational position with respect to said cassette, and further for providing that said grasping means grasps the media positioned between said core and said grasping means when said core is rotated to a second rotational position with respect to said cassette.

10. The media receiving cassette as claimed in claim 8, wherein said grasping means further includes at least one gripping element deposed on a surface facing said groove for engaging the media.

11. The media receiving cassette as claimed in claim 8, wherein said tracking means further includes a freely rotating wheel engaging a generally circular track located within said cassette as said core is rotated.

12. The media receiving cassette as claimed in claim 8, wherein said tracking means includes a pair of freely rotating wheels that respectively engage two generally circular tracks located within said cassette as said core is rotated.

13. The media receiving cassette as claimed in claim 8, wherein said rotatable core is formed from two elongated members joined together around an axial shaft.

14. The media receiving cassette as claimed in claim 8, wherein said grasping means is spring biased in a radially outward open position using said at least one flat leaf spring, to provide an opening between said grasping means and said core.

15. The media receiving cassette as claimed in claim 8, wherein said grasping means is spring biased in a radially outward open position using two flat leaf springs.

16. The media receiving cassette as claimed in claim 9, wherein said grasping means includes a spring biased grasping member that extends along a longitudinal length of said rotatable core.

17. A method of receiving imageable media in a light tight media receiving cassette in an imaging system with a movable optical carriage, said method comprising the steps of:

providing a rotatable core having a grasping unit cantileveredly mounted to said rotating core via at least one generally flat leaf spring, said core and said grasping unit mounted in said light tight cassette, said at least one generally flat leaf spring operative to bias said grasping unit radially outward from said rotatable core;

rotating said core together with said grasping unit, said grasping unit being radially moveable with respect to said core, and said grasping unit including a track follower having a wheel rotateably attached to each of a first and a second end of said grasping unit;

moving said grasping unit radially outward by moving said track follower radially outward in response to moving said track follower along a path defined by a generally circular track;and moving said grasping unit radially inward to grasp the imageable media by restricting the movement of said track follower in a radial direction as said core is rotated.

18. The method as claimed in claim 17, wherein said method further comprises the step of releasing the media from said cassette.

19. An apparatus for grasping an end of imageable media and winding said media around a portion of said apparatus, comprising:

a rotateable core having a first and second end;

at least two support members for supporting said first and second ends of said rotateable core, each of said support members having a generally circular track formed into a surface thereof, each of said generally circular tracks having a portion extending radially outward;

a groove longitudinally formed into a surface of said core for receiving a grasping unit;

at least two springs, each spring having a first end attached to said core in a cantilever configuration;

a grasping unit attached to a second end of each of said springs, said grasping unit operative to capture an edge of said media between an inside surface of said groove and said grasping unit;and a wheel rotatably attached to each of a first and second end of said grasping unit, said wheels moveably engaging said circular tracks;

wherein said grasping unit moves away from said core when said wheels engage said extended portion of said tracks creating a wide opening between said groove and said grasping unit, said opening permitting the insertion or removal of an edge of said media;

wherein said grasping unit moves toward said core when said wheels engage portions of said circular tracks other than said extended portions of said tracks closing said opening permitting said edge of media to be held between said grasping unit and a surface of said groove.

20. The apparatus of claim 19 wherein said grasping unit further comprises:

a first surface having a shape generally conforming to a portion of a second surface of said groove, said first surface extending along a longitudinal length of said core.

21. The apparatus of claim 20 wherein said grasping unit further comprises:

gripping material attached to said first surface of said grasping unit.

22. The apparatus of claim 19 wherein said grasping unit further comprises a gripping material deposed on a surface facing towards said groove for engaging said media.

23. The apparatus of claim 21 wherein said rotatable core is formed from two separate pieces joined together around an axial shaft.

24. The apparatus of claim 21 wherein said grasping unit is spring biased in a radially outward direction.

25. The apparatus of claim 21 wherein said springs are generally flat leaf springs.

26. The apparatus of claim 21 wherein said grasping unit extends along a longitudinal length of said core.

* * * * *